Patented Apr. 7, 1942

2,279,096

UNITED STATES PATENT OFFICE 2,279,096

PRODUCTION OF RESIN-LIKE CASEIN GLUE

Trygve Sparre, London, England, assignor to The Borden Company, New York, N. Y., a corporation of New Jersey No Drawing. Application July 3, 1940, Serial No. 343,768. In Great Britain June 22, 1939

7 Claims. (Cl. 260—6)

This invention relates to the production of a casein glue which is very suitable for use in making plywood by hot pressing.

It is a well-known fact that casein, in the moist state, has thermo-plastic properties. Heated to about 100° C. it attains a certain fluidity and this characteristic has been made use of technically for various purposes. Thus German patent specification No. 477,783 describes a process for gluing wood and other substances together by applying a thin, even layer of casein, swollen in water, on the surfaces to be glued, and then applying pressure and heat. The said German specification also indicates the possibility of adding substances of acidic or alkaline reaction to the casein, and also tanning substances, such as tannic acid, formaldehyde etc.

While a gluing process such as described, using casein alone, doubtlessly is theoretically possible, it has been found by me that the suggested addition of formaldehyde is highly desirable in commercial practice in order to complete the gluing operation in a reasonably short time.

The drawback of such a mixture, namely, casein, water and formaldehyde, when used as an adhesive in the woodworking industry, is that it is very difficult to apply, either by brush or mechanical spreader to the wood surface. The main difficulty however is that the plasticity of the casein does not seem sufficient to get an intimate contact and a good bond. A temperature of about 180° F. (366° F.) is necessary to make the protein reasonably plastic and even then the uneven thickness in the materials may cause poor adhesion due to the barely fluid glue not filling the unevennesses. The inclusion of formaldehyde even reduces the plasticity.

In order to make the mixture of casein, water and formaldehyde more thermo-plastic it might be suggested that the casein should be put into solution by means of alkali, but this is impracticable because formaldehyde clots casein when in solution in alkali. The amount of alkali that can be added before the casein swells or dissolves to such an extent that it clots with formaldehyde is not sufficient materially to increase the thermo-plasticity.

According to the present invention I make practicable the production of a mixture of casein, water and formaldehyde as an adhesive composition by including in the mixture urea in its capacity as plastifier for the casein. By the use of this ingredient a very high degree of thermo-plasticity can be obtained without endangering the stability of the mixture, as the formaldehyde has no clotting effect on the mixtures I employ.

The outstanding characteristic of the mixture is that urea is not used therein as a solubilizer in the cold. It is well known that urea acts as a solvent for casein but for that purpose it must be present in great proportions and the amount of water must be small. An excess of water would again precipitate the dissolved casein.

Now the proportions I select for urea and water are such that the casein is not dissolved at all. Nevertheless, when the mixture is used say for veneering of wood in a heated press, the casein will melt like animal glue, and then set hard by the action of the formaldehyde.

The use of urea as plastifier for the casein does not preclude the use of alkali as a component of the mixture. The use of some alkali seems even to be beneficial, as the softening effect of the urea is only felt at high temperatures. A combination of alkali with urea, however, has a softening effect on the casein, even in the cold.

By the term "alkali" is to be understood not only the hydroxides of sodium, potassium, ammonium, calcium and the like but also the hydrolysable salts of those radicals, such as soda ash, also alkaline organic substances, for example triethanolamine, and such combinations of calcium or other hydroxides with alkali salts as will produce alkalinity and for this reason are in common use for casein glue production.

It is of fundamental importance here that any alkali be only present in such small proportions that the combined effects of urea and alkali do not cause the mixture to become a solution at ordinary room temperature. The permissible amount varies according to the amount of urea present. I have found that equivalent amounts of various alkalies seem to produce substantially the same effect in this respect. Where 15 parts of urea are added to 100 parts of casein, I find that the amounts of alkali that can be used with the best advantage lie between the following limits:

(a) Sodium hydroxide 1% to 2.5% or equivalent amounts of other basic hydroxides.

(b) Soda ash 1.25% to 3.5% or equivalent amounts of other hydrolysable salts with alkaline reaction.

(c) Triethanolamine 3.25% to 8% or equivalent amounts of other organic bases.

(d) Calcium hydroxide 1% to 2.5% together with sodium fluoride 1.125% to 2.75% or equivalent amounts of other salts reacting with lime to give alkalinity. These a, b, c and d are all alkaline in reaction and will hereinafter be included in the term "alkali" for brevity.

The above stated amounts are however to some extent dependent upon the amount of formaldehyde used and upon the time elapsing before the formaldehyde is added.

If the amount of urea added to 100 parts of casein be doubled, i. e. if 30 parts are added instead of 15 parts, the amount of alkali used should be reduced by about 15 per cent and if the amount of urea be trebled, i. e. if 45 parts are added per 100 parts of casein, a further 15 per cent reduction is necessary. The actual amounts do however vary somewhat for different lots of casein, and the optimum proportions must be ascertained in each individual case. More than 50 parts of urea per 100 parts of casein can hardly be used as the setting effect of the formaldehyde by increased temperature is then made difficult, and the mixture also tends to soak into the wood. Less than 10 parts of urea to 100 parts of casein has very little effect as thermo-plastifier.

As far as the amount of formaldehyde in the mix is concerned, the proportion to use must be governed by the actual composition of the glue mixture and the order in which the mixing of the constituents is carried out. Amounts (based on the amount of the casein) up to 15 per cent of 40 per cent formaldehyde solution (i. e. up to 6% of actual formaldehyde, $CH_2O$) are satisfactory. The swelling caused by the alkali present is counteracted by the formaldehyde, and the final equilibrium reached is of importance both with regard to the consistency of the mixture and its thermo-plasticity. The more the amount of alkali used the greater should be the amount of formaldehyde used or the sooner it should be added.

The amount of water used must be sufficient to give a glue of an easily spreadable consistency; not less than 300 per cent and not more than 600 per cent calculated as percentage by weight of the casein present is satisfactory. Less water should not be used as it would be necessary to decrease the amount of alkali to such an extent that the mixture would have a tendency to separate into water and solids instead of forming a permanent suspension of swollen casein particles in the liquid.

Mixtures comprising essentially casein, water, formaldehyde and urea, as above indicated, with alkali and/or other ingredients, have important properties of great industrial value.

The inclusion of urea makes the mixture readily thermo-plastic, so that a low temperature can be used when adhering two wood surfaces by heat and pressure. At temperatures above 130° F. say 150° F. an excellent bond is obtained, because the mixture melts sufficiently to penetrate to some extent the grain of wood being glued with it. The fluidity at this temperature with say 15 to 30 parts of urea per 100 parts of casein is however not so pronounced that the glue is pressed through the wood, as happens when more than 50 per cent of urea would be used. In this latter case, one does not even obtain a setting effect of the mixture, the dissolving effect of the urea under heat being sufficient to counteract the hardening effect of the formaldehyde.

The mixtures according to the present invention have the following advantages:

(a) Low temperatures may be used, (e. g. 150° F.).

(b) The easier flow of the glue when melted makes an improved bond between uneven surfaces due to its "filling" effect.

(c) The resulting glue bond is less brittle than when casein alone is used.

(d) The pressing period when uniting two bodies may be substantially reduced.

(e) The mixture can easily be applied by brush or mechanical spreader, as it is of a soft texture. The casein particles absorb a great amount of water, swell and soften.

(f) The effect of the urea on the formaldehyde seems to produce some sort of condensation, resulting in an increased water-resistance and resistance to fungus growth.

As typical examples of the glue-like mixture of the present invention there are given the following:

(1)

| | Pounds |
|---|---|
| Casein | 100 |
| Urea | 15 |
| Soda ash | 2 |
| Formaldehyde 40% solution | 10 |
| Water | 450 |

(2)

| | |
|---|---|
| Casein | 100 |
| Urea | 30 |
| Lime | 2 |
| Sod. fluoride | 2.5 |
| Formaldehyde 40% solution | 10 |
| Water | 450 |

(3)

| | |
|---|---|
| Casein | 100 |
| Urea | 45 |
| Tri-ethanolamine | 4 |
| Formaldehyde 40% solution | 10 |
| Water | 450 |

It seems to be possible to mix the ingredients in any desired order without substantially affecting the properties of the resulting mixture. The relative amounts of alkali and formaldehyde must, however, be adjusted accordingly, as hereinbefore explained.

The prepared glue mixture may be applied to the surfaces to be glued either by brush or mechanical spreader. Except when the weather is very hot, an "assembly period" of at least 30 minutes can be allowed before pressing.

The pressing is carried out in presses that are heated, either by steam, hot water, or electrically, and an advantageous feature of the pressing operation is that no subsequent cooling of the platens is necessary, such as is required when animal glue is used as an adhesive.

The prepared glue mixture of the present invention liquefies under the combined action of heat and pressure, and is hardened in a very short time through the action of the formaldehyde. Glued panels come out of the press in a hot state, and therefore give off a great amount, up to 50%, of the moisture introduced in the first 10 minutes after pressing.

A great number of tests have been carried out varying both pressure, temperature and time of pressing. The results indicate that the amount of the pressure is of little importance provided it be sufficient completely to flatten the veneers. Pressures between 50 lbs. and 150 lbs. per sq. inch have given substantially the same result. The same thing applies to the pressing period, little being gained by prolonging the time beyond what is required for the heat to penetrate to and set the innermost layer of glue. In the making of three-ply panels of veneers, 1.5 mm. thick, 5 minutes and 20 minutes pressing has given the same result. As far as temperature is concerned, however, this ought not to go much below 150° F., 120° F. definitely giving a much inferior bond. The temperature should be at least 130° F.

The finished panels should be stacked on wooden sticks to enable air to circulate freely between them, and cause the remaining moisture to evaporate.

To give some idea of the bond to be obtained with this urea type of heat-reactive glue, I show below the strength figures obtained, one week after gluing, of ordinary three-ply birch panels:

Pounds per square inch
Dry strength ------------------------------- 425
After 48 hours immersion in cold water---- 200
After three hours in boiling water---------- 160

Plywood glued up with the above described glue can therefore be made to comply with the British Engineering Standards Association's Specification No. 4V.3 for aircraft construction which is a very rigid test for plywood glued with casein glue.

What I claim is:

1. A casein glue composition comprising a mixture of undissolved casein and water in amount sufficient to form a spreadable permanent suspension, an amount of urea sufficient to act as a plastifier for the casein but insufficient to put the casein into solution, and an amount of formaldehyde at least sufficient to harden the casein after being rendered thermoplastic.

2. A composition as claimed in claim 1, including also an amount of an alkali sufficient to increase the degree of swelling of the casein but insufficient in conjunction with the urea to cause the casein to go into solution at ordinary room temperature.

3. A composition as claimed in claim 1 in which the urea is present in an amount not less than 10% and not more than 50%, the water is present in an amount not less than 300% and not more than 600%, and the formaldehyde is present in an amount sufficient to harden the casein and not substantially above 15%, figured as the 40% solution, all these percentages being calculated as percentage by weight of the casein present.

4. A composition as claimed in claim 1, in which the amount of urea is about 15% and in which alkali is also present in the following proportion, the said alkali being selected from the group consisting of (a) caustic alkali equivalent to 1 to 2.5% of sodium hydroxide, (b) hydrolysable alkaline reacting salts equivalent to 1.25 to 3.5% of soda ash, (c) an alkaline organic substance equivalent to 3.25 to 8% of triethanolamine, and (d) calcium hydroxide 1% to 2.5%, together with sodium fluoride 1.125 to 2.75%, such percentages all being based on the amount of casein present.

5. A glue made from 300 to 600 parts of water, 100 parts of casein, formaldehyde solution equivalent to not over 15 parts of 40% solution thereof but being enough to harden the casein after being rendered thermoplastic, about 30 parts of urea, and an alkaline material selected from the group consisting of (a) caustic alkali equivalent to 0.85 to 2.13 parts of causic soda, (b) hydrolysable alkaline-reacting salts equivalent to 1.07 to 3 parts of soda ash, (c) an alkaline organic substance equivalent to 2.77 to 6.8 parts of triethanolamine and (d) 0.85 to 2.12 parts of calcium hydroxide together with .96 to 2.34 parts of sodium fluoride.

6. A glue made from 300 to 600 parts of water, 100 parts of casein, formaldehyde solution equivalent to not over 15 parts of 40% solution thereof but being enough to harden the casein after being rendered thermoplastic, about 45 parts of urea, and an alkaline material selected from the group consisting of (a) caustic alkali equivalent to 0.7 to 1.75 parts of caustic soda, (b) hydrolysable alkaline-reacting salts equivalent to .87 to 2.45 parts of soda ash, (c) an alkaline organic substance equivalent to 2.27 to 5.6 parts of triethanolamine, 0.7 to 1.75 parts of calcium hydroxide together with .79 to 1.92 parts of sodium fluoride.

7. A casein glue composition which is a readily spreadable mixture of undissolved swollen casein corresponding to 100 parts of air-dry casein, with about 10 to 50 parts of urea, together with an amount of an alkali molecularly equivalent to respectively 2.5 parts to 0.7 part of caustic soda, the larger amounts of urea to be used with the smaller amounts of the alkali, and together with an amount of formaldehyde which is sufficient to harden the casein after the latter is rendered plastic, and which is the equivalent of not over 15 parts of a 40% solution of formaldehyde, all well mixed with about 300 to 600 parts of water.

TRYGVE SPARRE.